United States Patent
Asai

(10) Patent No.: US 10,218,869 B2
(45) Date of Patent: Feb. 26, 2019

(54) NON-TRANSITORY COMPUTER-READABLE MEDIUM AND PORTABLE DEVICE

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/889,819

(22) Filed: Feb. 6, 2018

(65) Prior Publication Data

US 2018/0234572 A1 Aug. 16, 2018

(30) Foreign Application Priority Data

Feb. 13, 2017 (JP) ................................. 2017-023853

(51) Int. Cl.
*G06F 3/12* (2006.01)
*H04N 1/00* (2006.01)
*H04N 1/32* (2006.01)

(52) U.S. Cl.
CPC ..... *H04N 1/00973* (2013.01); *H04N 1/00307* (2013.01); *H04N 1/32534* (2013.01); *H04N 2201/0075* (2013.01); *H04N 2201/0094* (2013.01)

(58) Field of Classification Search
CPC ........... H04N 1/00973; H04N 1/00307; H04N 1/32534; H04N 2201/0075; H04N 2201/0094

USPC ......................................................... 358/1.15
See application file for complete search history.

(56) References Cited

U.S. PATENT DOCUMENTS

| 7,941,743 | B2 * | 5/2011 | Reddy | G03G 15/5091 358/1.15 |
| 2012/0243043 | A1 | 9/2012 | Asai | |
| 2014/0082506 | A1 * | 3/2014 | Maxwell | G06F 3/147 715/738 |
| 2017/0155794 | A1 * | 6/2017 | Sei | G06F 3/1205 |

FOREIGN PATENT DOCUMENTS

| JP | 2012-203742 A | 10/2012 |
| JP | 2014-211697 A | 11/2014 |

* cited by examiner

*Primary Examiner* — Neil R McLean
(74) *Attorney, Agent, or Firm* — Merchant & Gould P.C.

(57) ABSTRACT

A non-transitory computer-readable medium having a computer program stored thereon and readable by a computer of a portable device, the computer program, when executed by the computer, causes the portable device to perform: receiving a user operation of designating one of a plurality of image processing apparatuses as a designated apparatus; obtaining designated apparatus information that includes a set of an operation ID and a program ID; displaying, on a display, a first screen that includes a first activation object corresponding to the target program; and in response to receiving a user operation of designating the first activation object, activating the target program.

19 Claims, 9 Drawing Sheets

FIG. 3A

| OPERATION ID | APPLICATION ID | APPLICATION URL | MANUAL URL |
|---|---|---|---|
| SHEET PRINT | PRINT DEDICATED | www.install.com/print-app.html | — |
| SHEET SCAN | — | — | www.help.com/scan.html |

FIG. 3B

| OPERATION ID | APPLICATION ID | APPLICATION URL | MANUAL URL |
|---|---|---|---|
| SHEET PRINT | PRINT DEDICATED | www.install.com/print-app.html | — |
| LABEL PRINT | LABEL | www.install.com/label-app.html | www.help.com/label.html |

FIG. 3C

| APPLICATION ID | INSTALL INFORMATION |
|---|---|
| PRINT DEDICATED | INSTALLED |
| LABEL | NOT INSTALLED |
| GREETING CARD | INSTALLED |

NON-TRANSITORY COMPUTER-READABLE MEDIUM AND PORTABLE DEVICE

CROSS-REFERENCE TO RELATED APPLICATION

This application claims priority from Japanese Patent Application No. 2017-023853 filed on Feb. 13, 2017, the entire subject-matter of which is incorporated herein by reference.

TECHNICAL FILED

The disclosure relates to a program of a portable device configured to enable an image processing apparatus to execute an image processing operation.

BACKGROUND

There has been disclosed a terminal program for enabling an image processing apparatus to execute an image processing operation. The related-art terminal program can activate an external program, which replaces functions of the terminal program, or an external program, which complements functions of the terminal program. More specifically, the external program includes a program that provides an interface for editing image data, which is a target of the image processing operation, a program that is specialized to some functions provided in the terminal program, and the like.

In recent years, the number of the external programs published on the Internet gradually increases. That is, even when an external program to provide a user with a convenient function, it is difficult to find out the external program,

SUMMARY

Illustrative aspects of the disclosure provide a technology of appropriately notifying an external program configured to efficiently use an image processing apparatus designated by a user, regarding a program configured to cause an image processing apparatus to execute an image processing operation.

According to one illustrative aspect, there may be provided a non-transitory computer-readable medium having a computer program stored thereon and readable by a computer of a portable device, the portable device comprising a communication interface, an input interface, and a display, the computer program, when executed by the computer, causes the portable device to perform: receiving, through the input interface, a user operation of designating one of a plurality of image processing apparatuses that are able to perform communication with the portable device through the communication interface, the user operation designating one of the plurality of image processing apparatuses as a designated apparatus; obtaining designated apparatus information, the designated apparatus information including a set of an operation ID and a program ID, the operation ID being for identifying a target operation, the target operation being an image processing operation executable by the designated apparatus, the program ID being for identifying, from among external programs installable in the portable device, a target program that is able to instruct the designated apparatus to execute the target operation; displaying, on the display, a first screen, the first screen including a first activation object corresponding to the target program; receiving, through the input interface, a user operation of designating an object displayed on the first screen; and in response to receiving the user operation of designating the first activation object through the first screen, activating the target program.

According to the above configuration, the first activation object corresponding to the target program, which can instruct the designated apparatus to execute the target operation, of the external programs capable of being installed in the portable device is displayed on the first screen. That is, it is possible to enable the user to recognize an external program, which can efficiently use a function of the designated apparatus, of the plurality of external programs published on the Internet. Since the target program is activated by designating the first activation object, it is possible to efficiently use the designated apparatus with the simple user operation.

BRIEF DESCRIPTION OF DRAWINGS

FIGS. 3A to 3C depict examples of information stored in memories 32, 62, in which FIG. 3A depicts an operation list of an MFP 10A, FIG. 3B depicts an operation list of an MFP 10B, and FIG. 3C depicts a program list of a portable device 50;

FIGS. 7A and 7B depict display examples of a display 53, in which FIG. 7A depicts a main screen at a state where a designated apparatus is not designated, and FIG. 7B depicts the main screen at a state where a designated apparatus is designated; and FIGS. 8A and 8B depict display examples of the display 53, in which FIG. 8A depicts a confirmation screen 120 superimposed on the main screen, and FIG. 8B depicts an application introduction screen.

DETAILED DESCRIPTION

Hereinafter, an illustrative embodiment of the disclosure will be described with reference to the drawings. Incidentally, the illustrative embodiment to be described later is just an example of the disclosure, and the illustrative embodiment of the disclosure can be appropriately changed without changing the gist of the disclosure. For example, an execution sequence of each processing to be described later can be appropriately changed without changing the scope of the disclosure.

Figure 1:
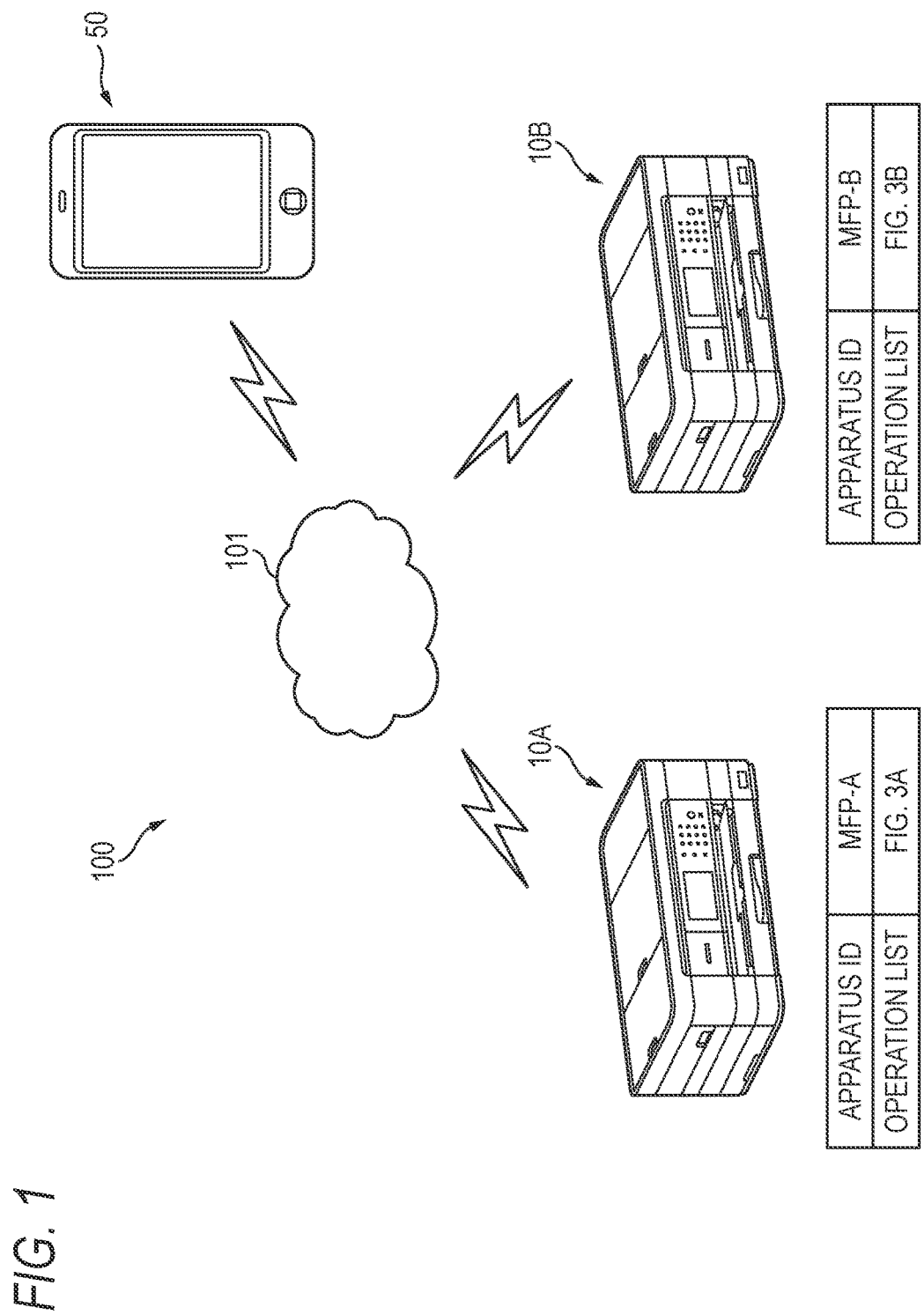
FIG. 1 is a schematic view of a system 100 in accordance with an illustrative embodiment.

FIG. 1 is a schematic view of a system 100 in accordance with an illustrative embodiment. The system 100 shown in FIG. 1 includes MFPs 10A, 10B (which may also be collectively referred to as "MFP 10", in the below) and a portable device 50. The MFP 10 and the portable device 50 are configured to perform communication with each other via a communication network 101. The communication network 101 may be a wired LAN, a wireless LAN or a combination thereof, for example. Alternatively, the MFP 10 and the portable device 50 may be connected to each other via a USB cable or the like.

Figure 2A:
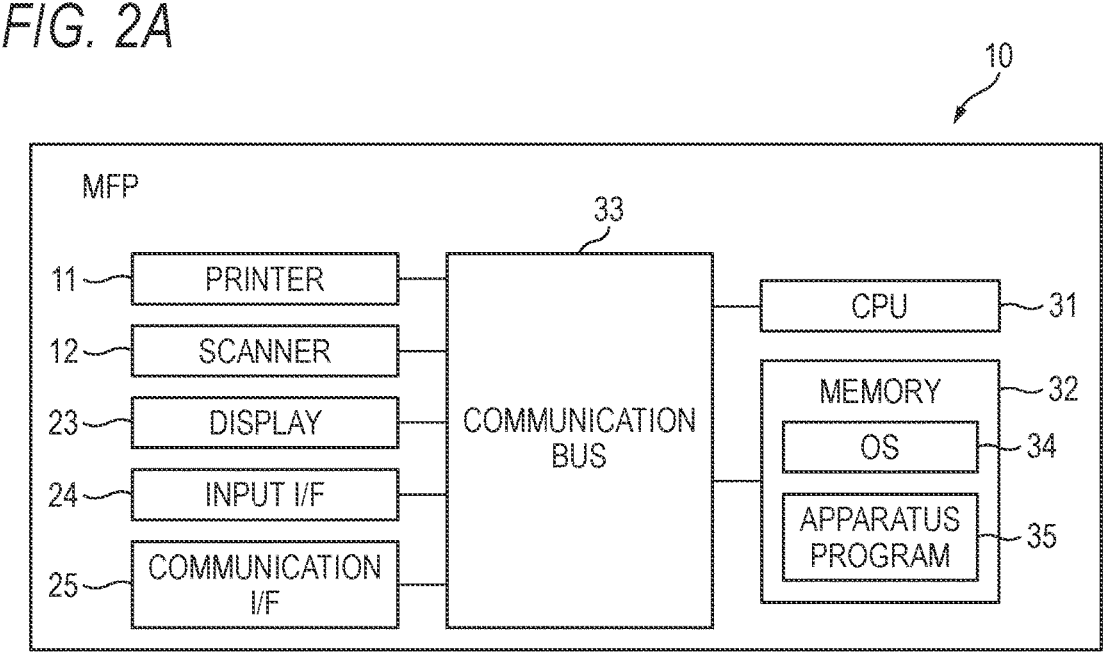
FIG. 2A is a block diagram of an MFP 10.

As shown in FIG. 2A, the MFP 10 mainly has a printer 11, a scanner 12, a display 23, an input I/F 24, a communication I/F 25, a CPU 31, a memory 32 and a communication bus 33.

The respective constitutional elements configuring the MFP 10 are connected to each other through the communication bus 33. The MFP 10 is an example of the image processing apparatus.

The printer 11 is hardware configured to execute a print operation of recording an image expressed by image data onto a medium to be recorded. In the illustrative embodiment, the inkjet-type printer 11 configured to record an image by ejecting inks is exemplified. However, the recording method of the printer 11 may also be an electrophotographic method. The scanner 12 is hardware configured to execute a scan operation of reading an image recorded on a document and generating image data (hereinafter, referred to as "scan data"). The print operation and the scan operation are examples of the image processing operation.

Incidentally, the specific example of the image processing operation is not limited to the above operations. The image processing operation may be a FAX transmission operation of FAX transmitting image data to an external apparatus in accordance with a FAX protocol, a FAX receiving operation of FAX receiving image data from an external apparatus in accordance with the FAX protocol, and the like, for example. Also, the MFPs 10A, 10B may be configured to execute at least one operation. Also, the operations that the MFPs 10A, 10B can execute may be different.

Also, the print operation includes a sheet print operation of recording an image to a recording sheet, which is an example of the medium to be recorded, and a label print operation of recording an image to a surface of a label (for example, CD-ROM, DVD-ROM, and the like), which is an example of the medium to be recorded. That is, the printer 11 of the MFP 10 capable of executing the label print operation has hardware configured to convey not only a recording sheet but also a label to a recording position at which an image is to be recorded to the medium to be recorded.

Also, the scan operation includes a sheet scan operation of reading an image recorded on a recording sheet to generate scan data, and a label scan operation of reading an image recorded on a label to generate scan data. That is, the MFP 10 capable of executing the label scan operation has an image processing function of specifying a center position of a label on an image expressed by scan data.

The display 23 is a liquid crystal monitor, an organic EL display or the like, and has a display surface for displaying a variety of information.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on the display surface of the display 23. An operation of designating an object displayed on the display surface of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 implemented as a touch sensor is configured to output position information indicative of a position on the display surface touched by the user. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. A user operation of tapping a position of an icon displayed on the display 23 is an example of the user operation of designating the icon.

The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark) can be adopted, for example. Also, when the MFP 10 and the portable device 50 are connected to each other by a USB cable or the like, the communication I/F 25 may be a USB interface to which the USB cable is to be detachably mounted.

The CPU 31 is configured to control overall operations of the MFP 10. The CPU 31 is configured to obtain and execute a variety of programs (which will be described later) from the memory 32, based on a variety of information output from the input I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. Incidentally, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable device 50, which will be described later.

An MIB (abbreviation of Management Information Base) of the memory 32 stores apparatus information shown in FIG. 1. The apparatus information includes an apparatus ID for identifying the MFP 10, and an operation list shown in FIGS. 3A and 3B. Incidentally, a format of the "apparatus ID" such as a text format, a binary format and the like is not particularly limited inasmuch as it is possible to uniquely identify the MFPs 10A, 10B on the communication network 101. This also applies to an operation ID and an application ID, which will be described later.

The operation list includes one or more operation records. The operation record corresponds to one of the image processing operations that the MFP 10 can execute. That is, the MFP 10A that is identified with an apparatus ID "MFP-A" can execute the sheet print operation and the sheet scan operation that are identified with operation IDs "sheet print" and "sheet scan". Incidentally, the MFP 10B that is identified with an apparatus ID "MFP-B" can execute the sheet print operation and the label print operation that are identified with operation IDs "sheet print" and "label print".

The operation record is an example of the set including an operation ID, an application ID, an application URL, and a manual URL. The operation record may not include all of the application ID, the application URL, and the manual URL. As an example, the operation record may include the operation ID, the application ID, and the application URL, and may not include the manual URL. As another example, the operation record may include the operation ID and the manual URL, and may not include the application ID and the application URL. The operation record is registered in the operation list by a developer of the MFP 10 when manufacturing the MFP 10, for example.

The operation ID is to identify an image processing operation (which may also be referred to as "target operation", in the below) that can be executed by the MFP 10. The application ID is an example of the program ID for identifying the external program 66 (which may also be referred to as "target program" or "target application", in the below), which can instruct the MFP 10 to execute the image processing operation identified with the operation ID, of the external programs 66 that can be installed in the portable device 50. The application URL is an example of the first address information indicative of a location of an execution file of the external program 66, which is identified with the application ID, in a server (not shown) on the Internet. The manual URL is an example of the second address information indicative of a location of a screen file (for example, an HTML file), which indicates a sequence for enabling the MFP 10 to execute the target operation, in the server (not shown) on the Internet.

Figure 2B:
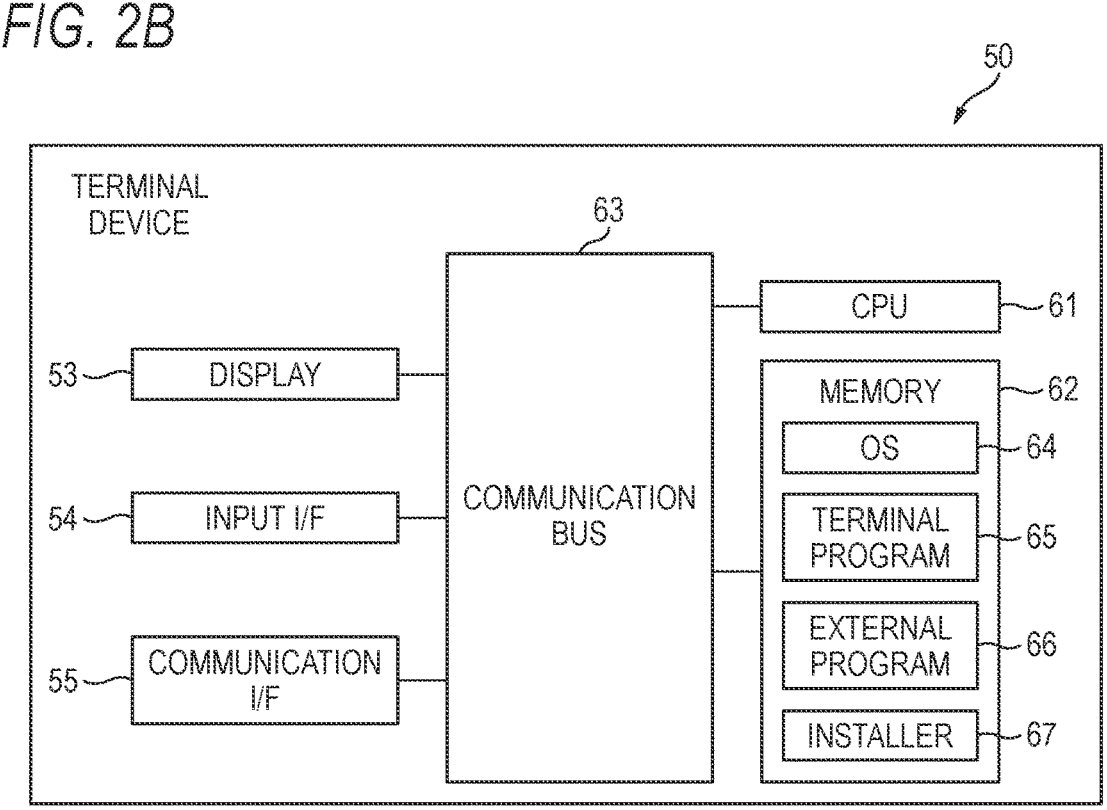
FIG. 2B is a block diagram of a portable device 50.

As shown in FIG. 2B, the portable device 50 mainly has a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 included in the portable device 50 have the configurations similar to the display 23, the input I/F 24, the communication I/F 25, the CPU 31, the memory 32 and the communication bus 33 included in the MFP 10, the descriptions thereof are omitted. The CPU 61 and the memory 62 configure an example of the controller.

The portable device 50 may be a portable phone, a smart phone, a tablet terminal, or the like, for example. More specifically, the display 53 of the portable device 50 preferably has a display screen size of 12 inch or less, and more preferably 8 inch or less. Also, the input I/F 54 of the portable device 50 is preferably a touch sensor superimposed on the display surface of the display 53. The memory 62 is configured to store therein an OS 64, a terminal program 65, one or more external programs 66, and an installer 67.

The OS 64 may be Android (registered trademark) OS, iOS (registered trademark), Windows Phone (registered trademark) Operating System or the like, for example. The OS 64 can execute a plurality of programs installed in the portable device 50 in parallel. The plurality of programs is virtually executed in parallel by a time-division multiplex method, for example. Also, the OS 64 is configured to execute one of the plurality of programs, which are to be executed in parallel, at the foreground and to execute the other programs at the background.

The foreground is a state where a screen associated with execution of the program is displayed in most of a display region of the display 53, for example. The background is a state where a screen associated with execution of another program, which is different from said program, is displayed in most of the display region of the display 53, for example. That is, the portable device 50 can display on the display 53 only a screen associated with execution of a program, which is being executed at the foreground, of the plurality of programs being executed in parallel.

The terminal program 65 is a program configured to cause the MFP 10 connected via the communication I/F 55 to execute the image processing operation. More specifically, the terminal program 65 causes the MFP 10, which is designated through the input I/F 54 by the user, to execute the image processing operation designated through the input I/F 54 by the user. Incidentally, the terminal program 65 of the illustrative embodiment can cause the MFP 10 to execute the sheet print operation and the sheet scan operation, which are examples of the correspondence operation, and cannot cause the MFP 10 to execute the label print operation and the label scan operation, which are examples of the non-correspondence operation.

Also, the terminal program 65 can activate the external program 66 installed in the portable device 50. The terminal program 65 is configured to designate, as an argument, a program ID of the external program 66, for example, and to execute an API (hereinafter, referred to as "activation API") that is provided by the OS 64. As the activation API is executed, the OS 64 activates the external program 66 identified with the designated program ID. Incidentally, the terminal program 65 may activate the external program 66 in a so-called plug-in manner or may activate the external program 66 by a sharing function that is provided by the OS 64.

The external program 66 is a program configured to operate in the portable device 50, like the terminal program 65. Also, the external program 66 is a program that is separate from the terminal program 65 and can be independently executed. That is, the external program 66 is different from a subroutine of the terminal program 65. Also, the external program 66 activated by the terminal program 65 may be configured to execute a predetermined operation, and to provide an execution result thereof to the terminal program 65, as a return value of the activation API or to complete the processing without providing an execution result of the operation to the terminal program 65.

In the illustrative embodiment, as specific examples of the external program 66, a print dedicated application, a label application, and a greeting card application are described. However, the specific examples of the external program 66 are not limited thereto. The external program 66 includes a program having a function, which is not provided in the terminal program 65, a program capable of simply implementing a function provided in the terminal program 65, a program having a function, which is implemented in more detail than a function provided in the terminal program 65, and the like, for example.

The print dedicated application is the external program 66 specialized to cause the MFP 10 to execute the sheet print operation. More specifically, the print dedicated application is a program capable of instructing the MFP 10 to execute only the sheet print operation of a plurality of image processing operations. The print dedicated application has less user operations, which are necessary to cause the MFP 10 to execute the sheet print operation with a default execution condition (for example, size "A4", sheet type "normal sheet", and color "color"), than the terminal program 65, for example. Also, the print dedicated application has more variations (for example, the number of items, and the number of parameters of each item) of a designable execution condition than the terminal program 65, for example.

The label application is the external program 66 specialized to cause the MFP 10 to execute the label print operation and the label scan operation. More specifically, the label application causes the MFP 10 to execute the label print operation of obtaining scan data generated by the label scan operation from the MFP 10, editing the obtained scan data in accordance with an instruction of the user, and targeting at the edited scan data. That is, the label application can instruct the MFP 10 to execute the label print operation and the label scan operation, which are the non-correspondence operations of the terminal program 65.

The greeting card application is the external program 66 specialized to enable the MFP 10 to execute the sheet print operation of editing an image (hereinafter, referred to as "communication surface image"), which is to be recorded on a communication surface of a postcard (e.g., a greeting card such as a new year's card), in accordance with an instruction of a user, and recording the edited communication surface image to the communication surface of the postcard. The greeting card application has more variations (for example, synthesis of a photograph, addresser information and any character string to a template image) of an instruction to edit the communication surface image than the terminal program 65, for example.

The installer 67 is a program for installing the external program 66 into the portable device 50. The installer 67 is configured to download an execution file of the designated external program 66 from a server on the Internet, and to store the downloaded execution file in a predetermined region of the memory 62, for example. Since the functions provided in the installer 67 are well-known, the detailed descriptions thereof are omitted.

As shown in FIG. 3C, for example, the memory 62 can store therein a program list. The program list includes one or more program records. The program record is stored in the memory 62 upon the install of the terminal program 65, for example. The program record corresponds to one of the plurality of external programs 66 that can be activated by the terminal program 65. The program record includes an application ID and install information.

The application ID is an example of the program ID for identifying the external program 66. That is, the print dedicated application is identified with an application ID "print dedicated", the label application is identified with an application ID "label", and the greeting card application is identified with an application ID "greeting card". The install information is information indicating whether the external program 66 identified with the application ID has been installed in the portable device 50. For the install information of the illustrative embodiment, "not installed" indicating that the corresponding external program 66 has not been installed in the portable device 50 or "installed" indicating that the corresponding external program 66 has been installed in the portable device 50 is set.

Also, although not shown, the memory 62 may be configured to store therein designated apparatus information. The designated apparatus information is apparatus information stored in the MIB of the MFP 10 designated in device selection processing, which will be described later. In the below, the apparatus ID included in the designated apparatus information is referred to as "designated apparatus ID", and the MFP 10 identified with the designated apparatus ID is referred to as "designated apparatus", depending on situations. Incidentally, when the MFP 10 is not designated, the designated apparatus information is not stored in the memory 62. The designated apparatus information is an example of the operation specifying information.

Also, although not shown, the memory 62 may be provided with a data folder. In the data folder, photograph data, document data, presentation data, table calculation data and the like may be stored. The diverse data stored in the data folder is data that can be a target of the sheet print operation.

<Operations of System 100>

Figure 5:
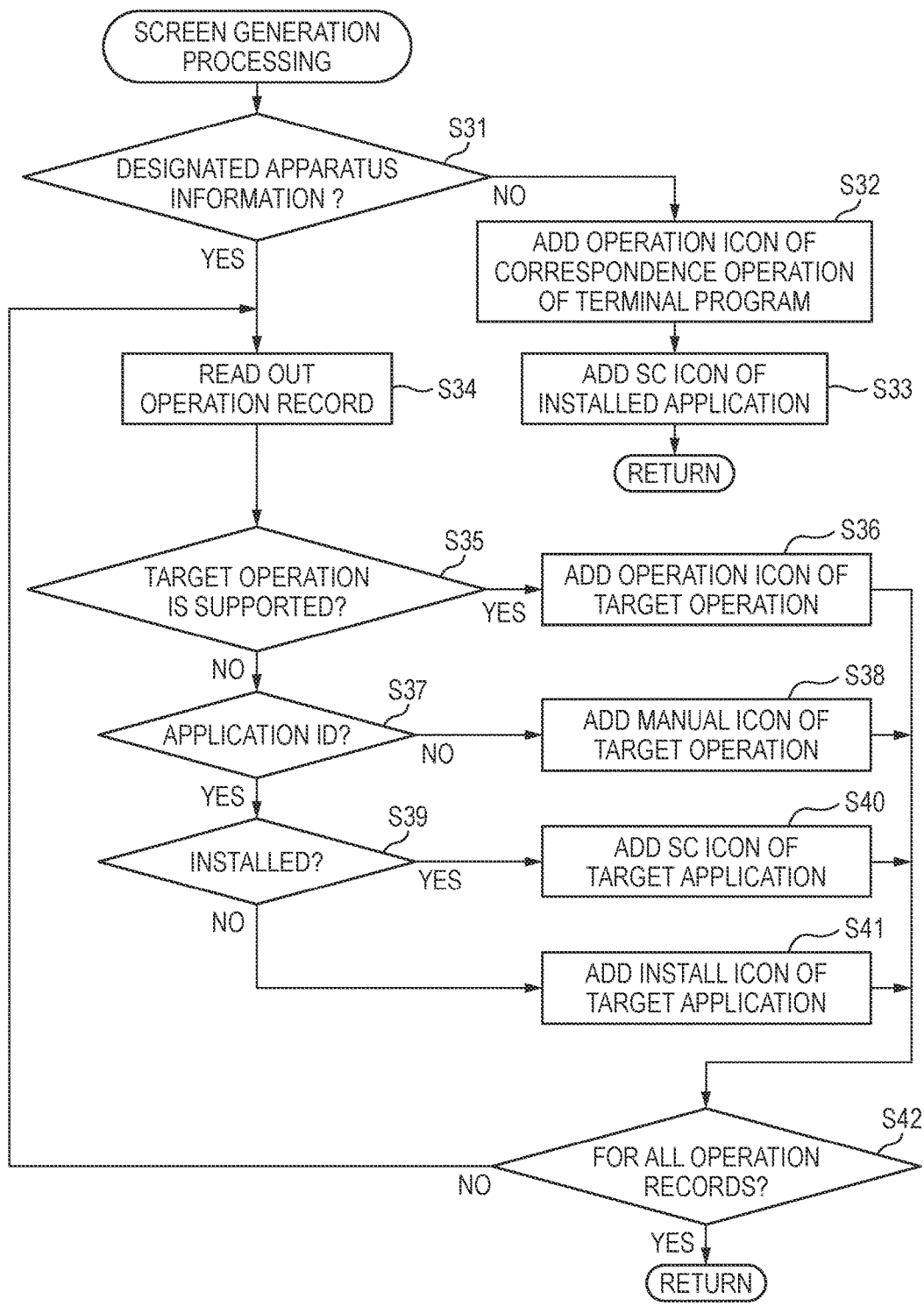
FIG. 5 is a flowchart of screen generation processing.
Figure 6B:
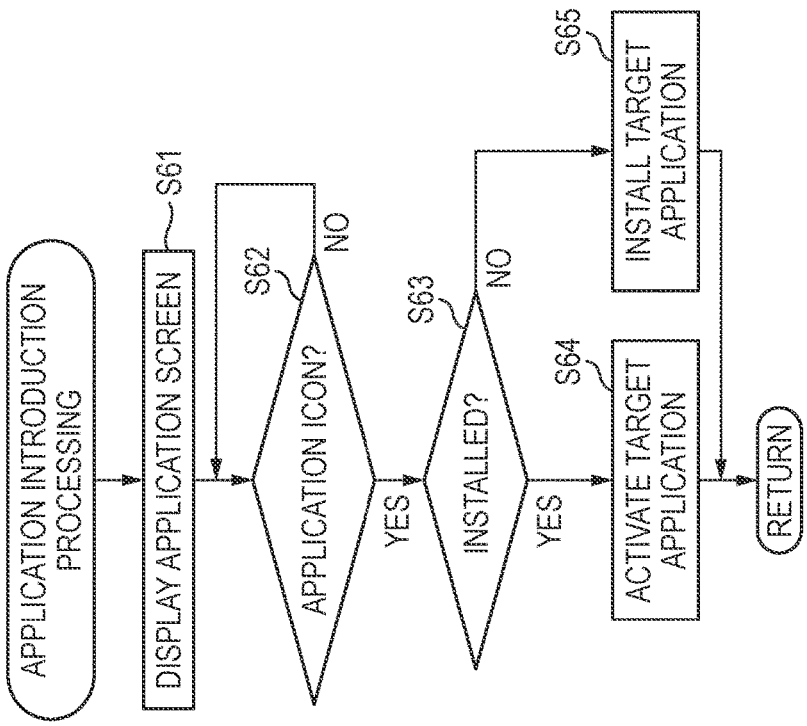
FIG. 6B is a flowchart of application introduction processing.
Figure 6A:
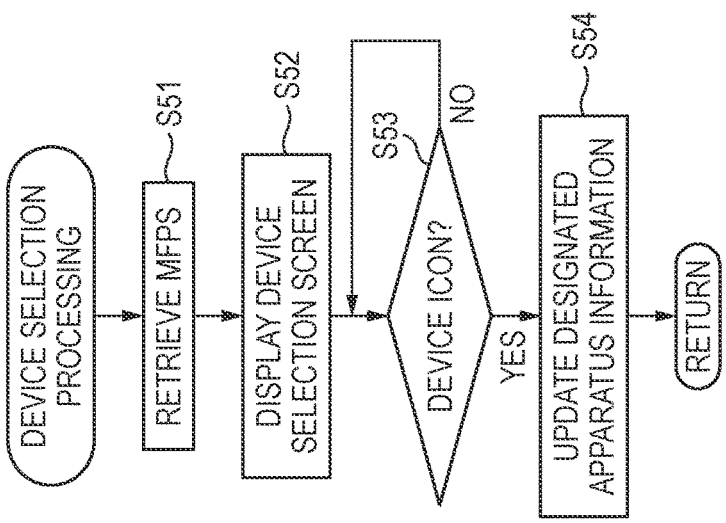
FIG. 6A is a flowchart of device selection processing.

The operations of the system 100 of the illustrative embodiment are described with reference to FIGS. 4 to 6. Incidentally, it is assumed that upon start of main processing shown in FIGS. 4A and 4B, the designated apparatus information has not been stored in the memory 62. Also, it is assumed that the print dedicated application and the greeting card application have been already installed in the portable device 50, and the label application has not been installed yet.

A flowchart of the specification basically indicates processing that is to be executed by the CPUs 31, 61 in accordance with commands described in the program. That is, in the below descriptions, the processing of "determination", "extraction", "selection", "calculation", "determining", "specifying", "control" and the like indicates the processing of the CPUs 31, 61. The processing that is to be executed by the CPUs 31, 61 includes hardware controls through the OSs 34, 64, too. Also, in the specification, "data" is expressed by a bit string that can be read by a computer. The data having substantially the same meaning and the different formats is handled as the same data. This also applies to the "information" of the specification.

First, the OS 64 of the portable device 50 displays a menu screen (not shown) on the display 53. The menu screen includes program icons corresponding to the programs installed in the portable device 50. That is, the menu screen is displayed thereon with at least program icons corresponding to the terminal program 65, the print dedicated application, and the greeting card application. Then, the OS 64 receives a user operation on the menu screen, through the input I/F 54.

As an example, the OS 64 activates and executes the greeting card application at the foreground, in response to a designation of the program icon corresponding to the greeting card application being received via the input I/F 54. As another example, the OS 64 activates and executes the terminal program 65 at the foreground, in response to a designation of the program icon corresponding to the terminal program 65 being received via the input I/F 54. In the below, the processing that is executed when the program icon corresponding to the terminal program 65 is designated is described.

Figure 4A:
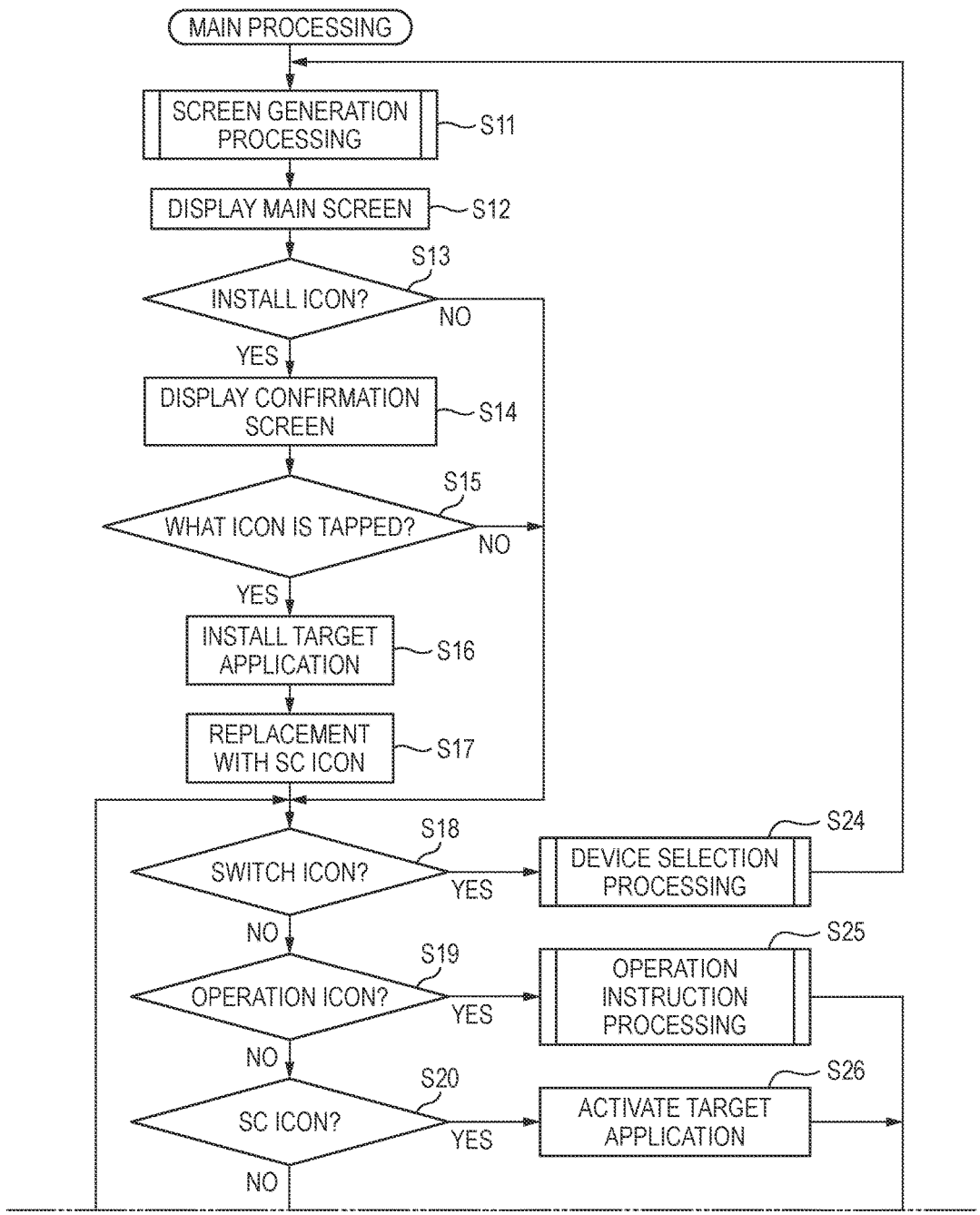
FIGS. 4A and 4B are flowcharts of main processing.
Figure 4B:
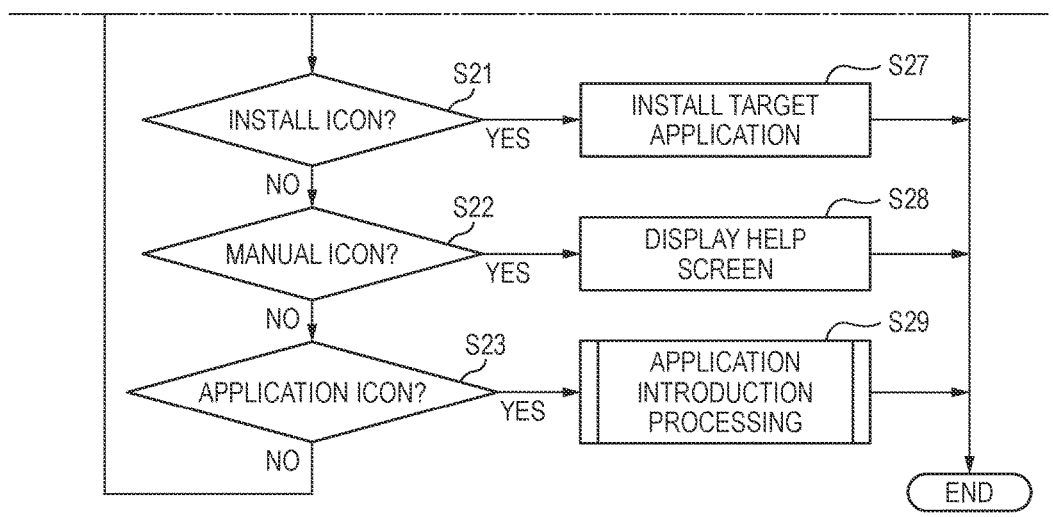

When activated by the OS 64, the terminal program 65 executes main processing shown in FIGS. 4A and 4B. First, the terminal program 65 executes screen generation processing (S11). The screen generation processing is processing of generating a main screen, which will be described later. More specifically, the screen generation processing is processing of determining an icon that is to be included in the main screen. The screen generation processing is described in detail with reference to FIG. 5.

First, the terminal program 65 determines whether the designated apparatus information is stored in the memory 62 (S31). Then, when it is determined that the designated apparatus information is not stored in the memory 62 (S31: No), the terminal program 65 adds operation icons 111, 112, which correspond to the correspondence operation of the terminal program 65, to the main screen (S32). Also, the terminal program 65 adds SC icons 113, 114, which correspond to the external programs 66 for which "installed" is set in the install information, to the main screen (S33). The operation icon that is added to the main screen in S32 is an example of the second operation object, and the SC icon that is added to the main screen in S33 is an example of the second activation object. Incidentally, processing (S34 to S42) that is executed when the designated apparatus information is stored in the memory 62 will be described later.

Figure 7A:
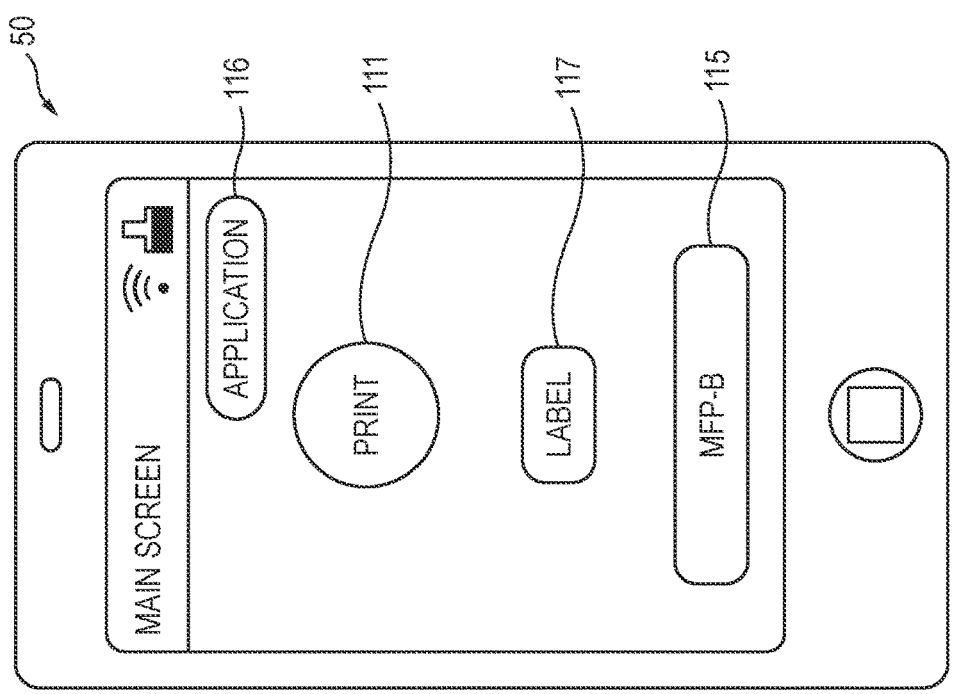

Returning to FIG. 4A, the terminal program 65 displays a main screen shown in FIG. 7A on the display 53 (S12). Also, the terminal program 65 determines whether the main screen displayed in S12 includes an install icon, which will be described later (S13). When it is determined that the main screen does not include the install icon (S13: No), the terminal program 65 skips over processing of S14 to S17, and receives a user operation on the main screen through the input I/F 54 (S18 to S23). The processing of S12 to display the main screen of FIG. 7A is an example of the fourth display processing. Incidentally, processing (S14 to S17) that is executed when the main screen includes the install icon will be described later.

The main screen shown in FIG. 7A is an example of the fourth screen including the operation icons 111, 112, the circular SC icons 113, 114, a switch icon 115, and an <application> icon 116. The operation icon 111 corresponds to an execution instruction of the sheet print operation, and the operation icon 112 corresponds to an execution instruction of the sheet scan operation. The SC icon 113 corresponds to an activation instruction of the print dedicated application, and the SC icon 114 corresponds to an activation instruction of the greeting card application. The switch icon 115 corresponds to a switching instruction of the designated apparatus. When the designated apparatus information is not stored in the memory 62, the switch icon 113 is described thereon with a character string "not selected" indicating that the designated apparatus has not been selected. The <application> icon 114 corresponds to a display instruction of an application introduction screen, which will be described later.

When a designation of the switch icon 113 is received through the input I/F 54 (S20: Yes), the terminal program 65 activates the print dedicated application associated with the SC icon 113 (S26). That is, the terminal program 65 designates an application ID for identifying the print dedicated application, as an argument, and activates the activation API. Then, the OS 64 ends the terminal program 65, activates the print dedicated application, and executes the print dedicated application at the foreground. In the case that the main screen of FIG. 7A is displayed, the processing of S20 is an example of the fourth receiving processing, and the processing of S26 is an example of the second activation processing.

Figure 7B:
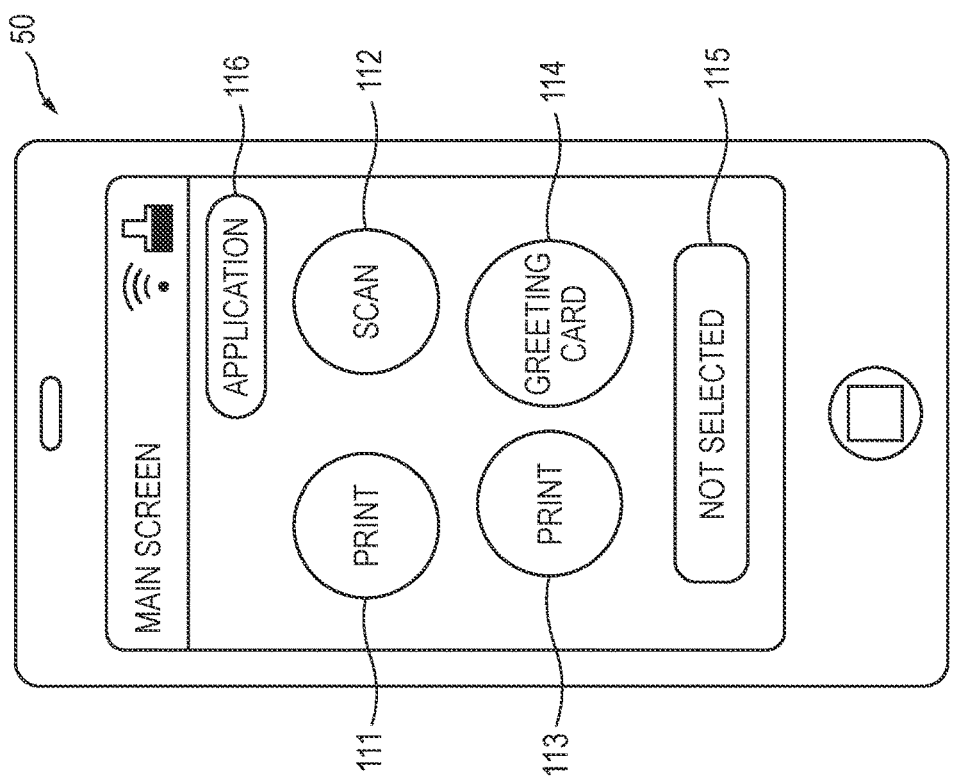

Also, although not shown, when a designation of the operation icon 111 shown in FIG. 7B is received through the input I/F 54, for example, the terminal program 65 displays a screen, which notifies that it is necessary to designate a designated apparatus, on the display 53. Also, when a designation of the switch icon 115 is received through the input I/F 54 (S18: Yes), for example, the terminal program 65 executes device selection processing (S24). The device selection processing is processing of switching the designated apparatus in accordance with an instruction of the user. The device selection processing is described in detail with reference to FIG. 6A.

First, the terminal program 65 retrieves the plurality of MFPs 10 with which it is possible to perform communication via the communication I/F 55 by using an SNMP (abbreviation of Simple Network Management Protocol) (S51), for example. Specifically, the terminal program 65 broadcasts transmission request information to the communication network 101 via the communication I/F 55. Then, the terminal program 65 receives the apparatus information, which is transmitted by the MFPs 10A, 10B in response to the transmission request information, through the communication I/F 55. That is, the terminal program 65 specifies the MFPs 10A, 10B, which are transmission sources of the apparatus information, as the communicable MFP 10. Incidentally, the method of retrieving the communicable MFP 10 may also be the other well-known method.

Then, the terminal program 65 displays a device selection screen (not shown) on the display 53 (S52). The device selection screen includes device icons corresponding to the MFPs 10A, 10B retrieved in S51. Then, the terminal program 65 receives a user operation on the device selection screen through the input I/F 54 (S53). The processing of S53 is an example of the first receiving processing.

When a designation of the device icon corresponding to the MFP 10B, for example, is received through the input I/F 54 (S53: Yes), the terminal program 65 stores the apparatus information received from the MFP 10B in the memory 62, as the designated apparatus information (S54). In case that the designated apparatus information has been already stored in the memory 62, the terminal program 65 overwrites the designated apparatus information with the new designated apparatus information. The processing of S545 is an example of the obtaining processing.

Then, returning to FIG. 4A, the terminal program 65 executes the processing of S11 and thereafter. That is, in the screen generation processing, when it is determined that the designated apparatus information is stored in the memory 62 (S31: Yes), the terminal program 65 sequentially executes processing of S34 to S41 for each of the operation records included in the designated apparatus information.

First, the terminal program 65 reads out one (for example, the operation record including the operation ID "sheet print" of FIG. 3B) of the operation records included in the designated apparatus information (S34). Then, the terminal program 65 determines whether the terminal program 65 can instruct the MFP 10 to execute the target operation "sheet print operation" indicated by the read operation record (S35). The processing of S35 is an example of the first determination processing. When it is determined that the terminal program 65 can instruct the sheet print operation (S35: Yes), the terminal program 65 adds the operation icon 111 corresponding to the execution instruction of the sheet print operation to the main screen (S36). The operation icon that is added to the main screen in S36 is an example of the first operation object.

Then, when it is determined that the processing of S34 to S41 has not been executed for all the operation records (S42: No), the terminal program 65 reads out another one (for example, the operation record including the operation ID "label print" of FIG. 3B) of the operation records included in the designated apparatus information (S34). Then, when it is determined that the terminal program 65 cannot instruct the target operation "label print operation" indicated by the read operation record (S35: No), the terminal program 65 determines whether the read operation record includes the application ID (S37). The processing of S37 is an example of the third determination processing.

Then, when it is determined that the read operation record includes the application ID "label" (S37: Yes), the terminal program 65 determines whether the target application "label application" identified with the application ID "label" has been installed in the portable device 50, i.e., "installed" has been set in the install information corresponding to the application ID "label" (S39). The processing of S39 is an example of the second determination processing.

Then, when it is determined that "not installed" has been set in the install information of the label application (S389: No), the terminal program 65 adds an install icon 117 corresponding to an application URL of the read operation record to the main screen (S41). The install icon that is added to the main screen in S41 is an example of the install object. Then, when it is determined that the processing of S34 to S41 has been executed for all the operation records included in the designated apparatus information (S42: Yes), the terminal program 65 ends the screen generation processing.

Although the detailed description is thereafter omitted, when it is determined that "installed" has been set in the install information of the label application (S39: Yes), the terminal program 65 adds an SC icon corresponding to the activation instruction of the label application to the main screen (S40). Also, when it is determined that the read operation record does not include the application ID (S37: No), the terminal program 65 adds a manual icon corresponding to a manual URL of the operation record to the main screen (S38). The SC icon that is added to the main screen in S40 is an example of the first activation object, and the manual icon that is added to the main screen in S38 is an example of the help object.

Then, returning to FIG. 4A, the terminal program 65 displays a main screen shown in FIG. 7B on the display 53 (S12). As shown in FIG. 7B, the main screen that is displayed after the MFP 10B is designated as a designated apparatus is different from FIG. 7A, in that it does not include the operation icon 112 and the SC icons 113, 114 and includes a rectangular install icon 117 having round corners, and the designated apparatus ID "MFP-B" is described on the switch icon 115. Also, although not shown, there is a possibility that the manual icon and the SC icon will be displayed on the main screen shown in FIG. 7B, in correspondence to the determination results of S35 to S39. The main screen of FIG. 7B is an example of the first screen. The processing of S12 to display the main screen of FIG. 7B is an example of the first display processing.

Figure 8A:
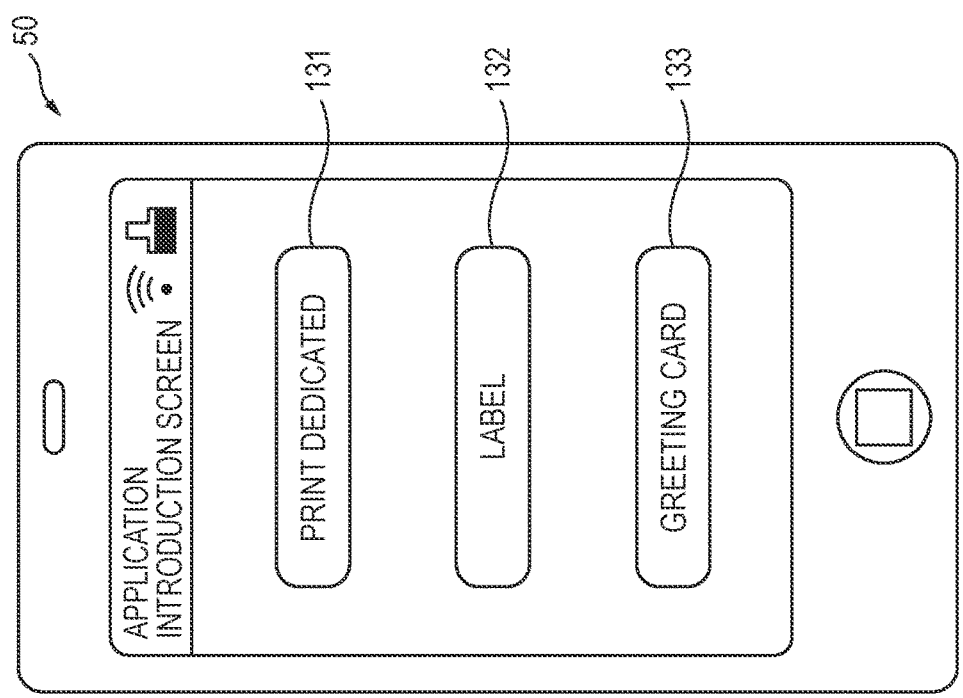

Then, the terminal program 65 determines whether the main screen displayed in S12 includes the install icon (S13). When it is determined that the main screen of FIG. 7B includes the install icon 117 (S13: Yes), the terminal program 65 displays a confirmation screen 120 of FIG. 8A on the display 53. Then, the terminal program 65 receives a user operation on the confirmation screen 120 through the input I/F 54 (S15). The processing of S14 is an example of the second display processing, and the processing of S15 is an example of the third receiving processing.

The confirmation screen 120 is an example of the second screen for confirming whether or not to immediately install the label application, which can be installed through the install icon 117. The confirmation screen 120 includes a message "The designated apparatus can be used with the <label> application. Do you want to install it?", a<Yes> icon 121, and a<No> icon 122. The <label> in the message corresponds to the application ID "label" of the label application, which can be installed through the install icon 117. Also, the confirmation screen 120 of the illustrative embodiment is a pop-up window that is displayed with being superimposed on the main screen of FIG. 7B.

Then, when a designation of the <Yes> icon 121 is received through the input I/F 54 (S15: Yes), the terminal program 65 installs the label application in the portable device 50 (S16). More specifically, the terminal program 65 designates, as an argument, an application URL associated with the install icon 117, and activates the installer 67. The tapping on the <Yes> icon 121 is an example of the first operation corresponding to an instruction to install the label application. The processing of S16 is an example of the first install processing.

Then, the installer 67 activated by the terminal program 65 obtains the application URL designated as an argument. Then, the installer 67 downloads an execution file of which a location is indicated by the obtained application URL from the server, and stores the downloaded execution file in a predetermined region of the memory 62. Then, the installer 67 sets "installed" in the install information corresponding to the application ID "label", and ends the processing.

Then, the terminal program 65 replaces the install icon 117 added to the main screen in S41 with an SC icon corresponding to the activation instruction of the label application installed in S16 (S17). The SC icon that is added to the main screen in S17 is an example of the first activation object. Then, the terminal program 65 grays out the confirmation screen 120, and displays the main screen, in which the install icon 117 of FIG. 7B has been replaced with the SC icon, on the display 53.

On the other hand, when a designation of the <No> icon 122 is received through the input I/F 54 (S15: No), the terminal program 65 skips over the processing of S16 and S17, grays out the confirmation screen 120, and displays the main screen of FIG. 7B on the display 53. The tapping on the <No> icon 122 is an example of the second operation corresponding to an instruction not to install the label application.

Then, the terminal program 65 receives a user operation on the main screen through the input I/F 54 (S18 to S23). The processing of S18 to S23 for the main screen of FIG. 7B is an example of the second receiving processing. Incidentally, since the device selection processing (S18: Yes→S24), which is executed when the switch icon 115 is designated, is common to the above descriptions, the overlapping descriptions thereof are omitted.

When a designation of the operation icon 111 shown in FIG. 7B is received through the input I/F 54 (S19: Yes), the terminal program 65 executes operation instruction processing for instructing the designated apparatus to execute the sheet print operation corresponding to the operation icon 111 (S25). Although the operation instruction processing is not shown, the terminal program 65 receives a user operation of designating, as designated data, one of multiple data stored in the memory 62 or in the server (not shown) on the Internet, through the input I/F 54. Then, the terminal program 65 transmits print instruction information to the MFP 10B, which is a designated apparatus, through the communication I/F 55. The print instruction information is an example of the operation instruction information for instructing execution of the print operation for the designated data. The print instruction information includes the designated data, for example.

Incidentally, the apparatus program 35 of the MFP 10B receives the print instruction information from the portable device 50 through the communication I/F 25. Then, the apparatus program 35 causes the printer 11 to execute the print operation in accordance with the received print instruction information. That is, the printer 11 records, on a sheet, an image expressed by the designated data included in the print instruction information.

When a designation of the install icon 117 is received through the input I/F 54 (S21: Yes), the terminal program 65 installs the label application in the portable device 50 (S27). The processing of S27 is an example of the first install processing, and may be the same as the processing of S16. Also, when a designation of the SC icon (not shown) is received through the input I/F 54 (S20: Yes), the terminal program 65 activates the label application corresponding to the SC icon (S26). The processing of S26, which is executed when the main screen of FIG. 7B is displayed, is an example of the first activation processing, and is common to the above description.

Also, when a designation of the manual icon (not shown) is received through the input I/F 54 (S22: Yes), the terminal program 65 receives a screen file of which a location is indicated by the manual URL associated with the designated manual icon from the server through the communication I/F 55, and displays a help screen (not shown) expressed by the received screen file on the display 53 (S28). The help screen is an example of the third screen to show an operation sequence of the designated apparatus for executing the label print operation. The processing of S28 is an example of the third display processing.

Also, when a designation of the <application> icon 116 shown in FIG. 7A or 7B is received through the input I/F 54 (S23: Yes), the terminal program 65 executes application introduction processing (S29). The application introduction processing is processing for introducing the external program 66, which can be activated by the terminal program 65, to the user. The application introduction processing is described in detail with reference to FIG. 6B.

Figure 8B:
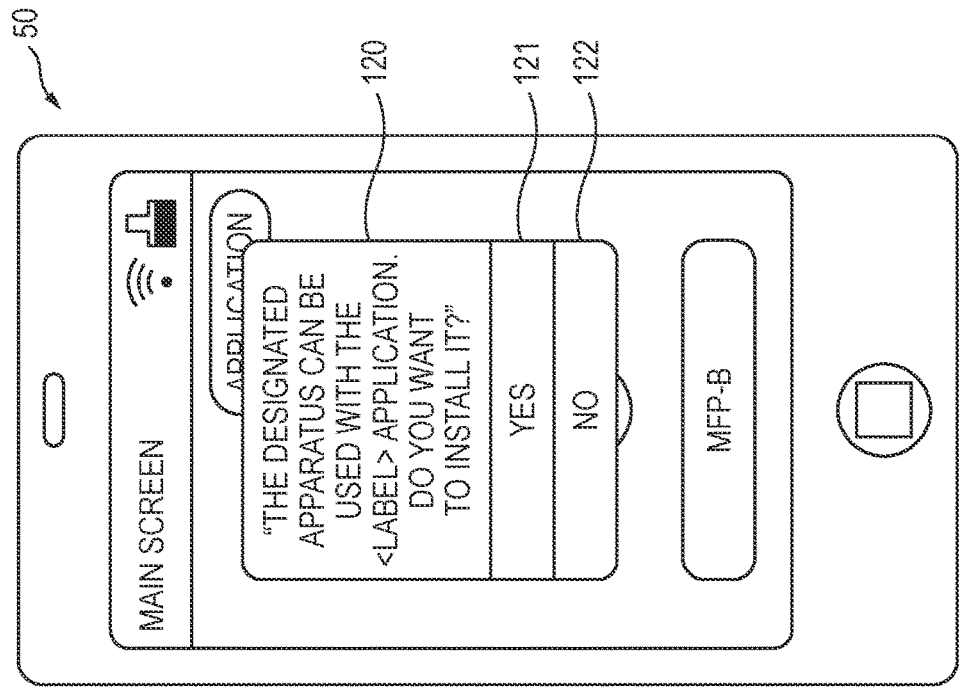

First, the terminal program 65 displays an application introduction screen shown in FIG. 8B on the display 53 (S61). The application introduction screen is an example of the fifth screen including application icons 131, 132, 133. The application icons 131 to 133 are examples of the program object corresponding to one of program records registered in the program list, respectively. That is, the application icons 131 to 133 corresponding to the number of the program records are displayed on the application introduction screen. Then, the terminal program 65 receives a user operation on the application introduction screen through the input I/F 54 (S62). The processing of S61 is an example of the fifth display processing, and the processing of S62 is an example of the fifth receiving processing.

Then, when a user operation of designating the application icon is received through the input I/F 54 (S62: Yes), the terminal program 65 determines whether the external program 66 indicated by the program record corresponding to the designated application icon has been already installed in the portable device 50 (S63). That is, the terminal program 65 may determine a setting value of the install information of the program record corresponding to the designated application icon. The processing of S63 is an example of the fourth determination processing.

When "installed" has been set in the install information of the program record (S63: Yes), the terminal program 65 activates the external program 66 indicated by the program record (S64). The processing of S64 is an example of the third activation processing, and may be the same as the processing of S26. On the other hand, when "not installed" has been set in the install information of the program record (S63: No), the terminal program 65 installs the external program 66 indicated by the program record (S65). The processing of S65 is an example of the second install processing, and may be the same as the processing of S16 and S27.

<Advantages of Illustrative Embodiment>

According to the illustrative embodiment, the SC icon corresponding to the external program 66, which can instruct the designated apparatus to execute the image processing operation, is displayed on the main screen. That is, it is possible to enable the user to recognize the external program, which can efficiently use a function of the designated apparatus, of the plurality of external programs 66 published on the Internet. Since the external program 66 is activated by designating the SC icon, it is possible to efficiently use the designated apparatus with the simple user operation.

Also, on the main screen of the illustrative embodiment, the operation icon 111 corresponding to the sheet print operation, which can be instructed by the terminal program 65, and the SC icon corresponding to the label print operation, which cannot be instructed by the terminal program 65, are displayed. That is, it is possible to enable the user to recognize the label application, which can instruct the label print operation that is not supported by the terminal program 65. In other words, even when the MFP 10B, which can execute the label print operation that is not supported by the terminal program 65, is designated as a designated apparatus, it is possible to efficiently use the designated apparatus.

Also, according to the illustrative embodiment, in case that the label application has not been installed in the portable device 50, the install icon associated with the application URL, which has been included in advance in the designated apparatus information, is displayed on the main screen. Then, the install icon is designated, so that the execution file of which the location is indicated by the application URL is installed. Thereby, even though the user does not search the location of the execution file of the label application, it is possible to install the label application in the portable device 50. That is, it is possible to simplify the user operation of installing the label application.

Also, according to the illustrative embodiment, when the install icon is added to the main screen (S13: Yes), the confirmation screen 120 is displayed before receiving the user operation on the main screen (S14). Thereby, since it is possible to urge the user to install the label application, it is possible to further efficiently use the function of the designated apparatus.

Incidentally, the SC icon and the install icon are preferably displayed on the main screen so that the user can visually distinguish the same. As an example, as shown in FIG. 7, the "visually distinguishable aspect" may be an aspect in which outer shapes of the SC icons 113, 114 and the install icon 117 (for example, shapes and colors of the icons) are different. As another example, the "visually distinguishable aspect" may be an aspect where a region in which the SC icons 113, 114 are to be displayed and a region in which the install icon 117 is to be displayed are provided at different positions on the main screen. Thereby, it is possible to enable the user to recognize at one view whether the external program 66 corresponding to the icon has been installed.

Also, according to the illustrative embodiment, when there is no external program 66 that can instruct the target operation, the manual icon is added to the main screen. Thereby, it is possible to enable the user to recognize how to operate the designated apparatus so as to execute the target operation. Incidentally, the terminal program 65 is not limited to the configurations of analyzing the screen file and displaying the help screen, and may be configured to instruct a browser program (not shown) to display the help screen. That is, the terminal program 65 designates, as an argument, the manual URL associated with the manual icon, and activates the browser program. Then, the browser program activated by the terminal program 65 obtains the manual URL designated as an argument, and executes the above processing, instead of the terminal program 65.

Also, in the illustrative embodiment, before the designated apparatus is designated, the main screen includes the operation icons 111, 112 corresponding to the image processing operations, which the terminal program 65 can instruct the MFP 10 to execute, and the SC icons 113, 114 corresponding to the external programs 66 installed in the portable device 50, as shown in FIG. 7A. Thereby, it is possible to enable the user to recognize the image processing operation, which can be instructed by the terminal program 65, and the external program 66, which can be activated at present by the terminal program 65.

Also, according to the illustrative embodiment, when the <application> icon 116 is designated by the user, the application introduction screen is displayed. On the application introduction screen, the application icons 131 to 133 of the external programs 66 that can be activated by the terminal program 65 are displayed in a list, irrespective of whether it is possible to instruct the designated apparatus to execute the image processing operation and whether the portable device 50 has been installed at present. Therefore, it is possible to enable the user to recognize the external programs 66 in the diverse aspects.

In the illustrative embodiment, the example where the designated apparatus information stored in advance in the MFP 10 is obtained has been described. However, the obtaining source of the designated apparatus information is not limited to the designated apparatus. As another example, the designated apparatus information of the MFP 10 may include model information indicative of a model of the MFP 10, instead of the operation list. Also, the model information and the operation list may be stored with being associated in the server (not shown) on the Internet. The terminal program 65 may be configured to receive the apparatus information including the model information from the designated apparatus. Also, the terminal program 65 may be configured to transmit the transmission request information including the model information received from the designated apparatus to the server through the communication I/F 55. Also, the terminal program 65 may be configured to receive the operation list corresponding to the model information from the server through the communication I/F 55, as a response to the transmission request information. This processing is an example of the obtaining processing.

Also, in the MFP 10 and the portable device 50 of the illustrative embodiment, the various programs stored in the memories 32, 62 are executed by the CPUs 31, 61, so that the respective processing to be executed by the controller of the disclosure is implemented. However, the configuration of the controller is not limited thereto and some or all of the controller may be implemented by the hardware such as an integrated circuit and the like.

Also, the disclosure can be implemented as not only the MFP 10 and the portable device 50 but also a program configured to enable the MFP 10 and the portable device 50 to execute the processing. The program may be provided with being recorded in a non-transitory recording medium. The non-transitory recording medium may include a memory mounted on a server that can be connected to the MFP 10 and the portable device 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable medium having a computer program stored thereon and readable by a computer of a portable device, the portable device comprising a communication interface, an input interface, and a display, the computer program, when executed by the computer, causes the portable device to perform:
   receiving, through the input interface, a user operation of designating one of a plurality of image processing apparatuses that are able to perform communication with the portable device through the communication interface, the user operation designating one of the plurality of image processing apparatuses as a designated apparatus;
   obtaining designated apparatus information, the designated apparatus information including a set of an operation Identification (ID) and a program ID, the operation ID being for identifying a target operation, the target operation being an image processing operation executable by the designated apparatus, the program ID being for identifying, from among external programs installable in the portable device, a target program that is able to instruct the designated apparatus to execute the target operation;
   displaying, on the display, a first screen, the first screen including a first activation object corresponding to the target program;
   receiving, through the input interface, a user operation of designating an object displayed on the first screen; and
   in response to receiving the user operation of designating the first activation object through the first screen, activating the target program.

2. The non-transitory computer-readable medium according to claim 1,
   wherein the computer program, when executed by the computer, further causes the portable device to perform determining whether the program is able to instruct the designated apparatus to execute the target operation,
   wherein in a case where it is determined that the computer program is not able to instruct the designated apparatus to execute the target operation, the displaying of the first screen is performed by displaying the first screen, the first screen including the first activation object,
   wherein in a case where it is determined that the computer program is able to instruct the designated apparatus to execute the target operation, the displaying of the first screen is performed by displaying the first screen, the first screen including a first operation object corresponding to the target operation, and
   wherein the computer program, when executed by the computer, further causes the portable device to perform, in response to receiving the user operation of designating the first operation object through the first screen, transmitting operation instruction information for instructing execution of the target operation to the designated apparatus through the communication interface.

3. The non-transitory computer-readable medium according to claim 1,
   wherein the set includes first address information indicating a location of an execution file of the target program in a server on the Internet, wherein the computer program, when executed by the computer, further causes the portable device to perform determining whether the target program is installed in the portable device, wherein in a case where it is determined that the target program is installed in the portable device, the displaying of the first screen is performed by displaying the first screen, the first screen including the first activation object, wherein in a case where it is determined that the target program is not installed in the portable device, the displaying of the first screen is performed by displaying the first screen, the first screen including an install object corresponding to the first address information, and wherein the computer program, when executed by the computer, further causes the portable device to perform, in response to receiving the user operation of designating the install object through the first screen, installing the execution file in the portable device, a location of the execution file being indicated by the first address information.

4. The non-transitory computer-readable medium according to claim 3, wherein prior to causing the portable device to perform the displaying of the first screen, the computer program, when executed by the computer, further causes the portable device to perform:

in the case where it is determined that the target program is installed in the portable device, displaying, on the display, a second screen for confirming whether or not to install the target program;

receiving, through the input interface, a first operation or a second operation on the second screen; and in response to receiving the first operation on the second screen, performing the installing of the execution file, wherein the displaying of the first screen after receiving the first operation on the second screen is performed by displaying the first screen, the first screen including the first activation object, and wherein the displaying of the first screen after receiving the second operation on the second screen is performed by displaying the first screen, the first screen including the install object.

5. The non-transitory computer-readable medium according to claim 3, wherein the displaying of the first screen is performed by displaying the first activation object and the install object such that the first activation object and the install object are visually distinguishable.

6. The non-transitory computer-readable medium according to claim 1, wherein the set includes, instead of the program ID, second address information indicating a location of a screen file indicative of a sequence for enabling the designated apparatus to execute the target operation in a server on the Internet, wherein the computer program, when executed by the computer, further causes the portable device to perform determining whether the program ID is included in the designated apparatus information, wherein in a case where it is determined that the program ID is included in the designated apparatus information, the displaying of the first screen is performed by displaying the first screen, the first screen including the first activation object, wherein in a case where it is determined that the program ID is not included in the designated apparatus information, the displaying of the first screen is performed by displaying the first screen, the first screen including a help object corresponding to the second address information, and wherein the computer program, when executed by the computer, further causes the portable device to perform, in response to receiving the help object through the first screen, displaying, on the display, a third screen expressed by the screen file, a location of the screen file being indicated by the second address information.

7. The non-transitory computer-readable medium according to claim 1, wherein prior to the designated apparatus being designated by receiving the user operation of designating one of the plurality of image processing apparatuses, the computer program, when executed by the computer, further causes the portable device to perform:

displaying, on the display, a fourth screen, the fourth screen including:

a second operation object corresponding to the image processing operation that the computer program is able to instruct the image processing apparatus to execute; and a second activation object corresponding to the external program installed in the portable device;

receiving, through the input interface, a user operation of designating the object displayed on the fourth screen; and in response to receiving the user operation of designating the second activation object through the fourth screen, activating the external program corresponding to the designated second activation object.

8. The non-transitory computer-readable medium according to claim 1, wherein the computer program, when executed by the computer, further causes the portable device to perform:

displaying, on the display, a fifth screen, the fifth screen including a plurality of program objects corresponding to the external programs that are able to be activated by the computer program;

receiving, through the input interface, a user operation of designating the object displayed on the fifth screen;

in response to receiving the user operation of designating the program object through the fifth screen, determining whether the corresponding external program is installed in the portable device;

in a case where it is determined that the external program is installed in the portable device, activating the external program; and in a case where it is determined that the external program is not installed in the portable device, installing the external program in the portable device.

9. The non-transitory computer-readable medium according to claim 1, wherein the designated apparatus information includes a plurality of the sets, and wherein the displaying of the first screen is performed by displaying the first screen, the first screen including a plurality of the objects, each of the objects corresponds to respective one of the sets.

10. The non-transitory computer-readable medium according to claim 1, wherein the obtaining is performed by receiving the designated apparatus information from the designated apparatus through the communication interface.

11. A portable device comprising:

a communication interface;

an input interface;
a display; and
a controller configured to:
- receive, through the input interface, a user operation of designating one of a plurality of image processing apparatuses that are able to perform communication with the portable device through the communication interface, the user operation designating one of the plurality of image processing apparatuses as a designated apparatus;
- obtain designated apparatus information, the designated apparatus information including a set of an operation Identification (ID) and a program ID, the operation ID being for identifying a target operation, the target operation being an image processing operation executable by the designated apparatus, the program ID being for identifying, from among external programs installable in the portable device, a target program that is able to instruct the designated apparatus to execute the target operation;
- display, on the display, a first screen, the first screen including a first activation object corresponding to the target program;
- receive, through the input interface, a user operation of designating an object displayed on the first screen; and
- in response to receiving the user operation of designating the first activation object through the first screen, activate the target program.

12. The portable device according to claim 11,
wherein the controller is further configured to determine whether a terminal program is able to instruct the designated apparatus to execute the target operation,
wherein in a case where it is determined that the terminal program is not able to instruct the designated apparatus to execute the target operation, the displaying of the first screen is performed by displaying the first screen, the first screen including the first activation object,
wherein in a case where it is determined that the terminal program is able to instruct the designated apparatus to execute the target operation, the displaying of the first screen is performed by displaying the first screen, the first screen including a first operation object corresponding to the target operation, and
wherein the controller is further configured to, in response to receiving the user operation of designating the first operation object through the first screen, transmit operation instruction information for instructing execution of the target operation to the designated apparatus through the communication interface.

13. The portable device according to claim 11,
wherein the set includes first address information indicating a location of an execution file of the target program in a server on the Internet,
wherein the controller is further configured to determine whether the target program is installed in the portable device,
wherein in a case where it is determined that the target program is installed in the portable device, the displaying of the first screen is performed by displaying the first screen, the first screen including the first activation object,
wherein in a case where it is determined that the target program is not installed in the portable device, the displaying of the first screen is performed by displaying the first screen, the first screen including an install object corresponding to the first address information, and
wherein the controller is further configured to, in response to receiving the user operation of designating the install object through the first screen, install the execution file in the portable device, a location of the execution file being indicated by the first address information.

14. The portable device according to claim 13, wherein the displaying of the first screen is performed by displaying the first activation object and the install object such that the first activation object and the install object are visually distinguishable.

15. The portable device according to claim 11,
wherein the set includes, instead of the program ID, second address information indicating a location of a screen file indicative of a sequence for enabling the designated apparatus to execute the target operation in a server on the Internet,
wherein the controller is further configured to determine whether the program ID is included in the designated apparatus information,
wherein in a case where it is determined that the program ID is included in the designated apparatus information, the displaying of the first screen is performed by displaying the first screen, the first screen including the first activation object,
wherein in a case where it is determined that the program ID is not included in the designated apparatus information, the displaying of the first screen is performed by displaying the first screen, the first screen including a help object corresponding to the second address information, and
wherein the controller is further configured to, in response to receiving the help object through the first screen, display, on the display, a third screen expressed by the screen file, a location of the screen file being indicated by the second address information.

16. The portable device according to claim 11, wherein prior to the designated apparatus being designated by receiving the user operation of designating one of the plurality of image processing apparatuses, the controller is further configured to:
- display, on the display, a fourth screen, the fourth screen including:
  - a second operation object corresponding to the image processing operation that the computer program is able to instruct the image processing apparatus to execute; and
  - a second activation object corresponding to the external program installed in the portable device;
- receive, through the input interface, a user operation of designating the object displayed on the fourth screen; and
- in response to receiving the user operation of designating the second activation object through the fourth screen, activate the external program corresponding to the designated second activation object.

17. The portable device according to claim 11, wherein the controller is further configured to:
- display, on the display, a fifth screen, the fifth screen including a plurality of program objects corresponding to the external programs that are able to be activated by the terminal program;
- receive, through the input interface, a user operation of designating the object displayed on the fifth screen;

in response to receiving the user operation of designating the program object through the fifth screen, determine whether the corresponding external program is installed in the portable device;

in a case where it is determined that the external program is installed in the portable device, activate the external program; and in a case where it is determined that the external program is not installed in the portable device, install the external program in the portable device.

18. The portable device according to claim 11, wherein the designated apparatus information includes a plurality of the sets, and wherein the displaying of the first screen is performed by displaying the first screen, the first screen including a plurality of the objects, each of the objects corresponds to respective one of the sets.

19. The portable device according to claim 11, wherein the obtaining is performed by receiving the designated apparatus information from the designated apparatus through the communication interface.

* * * * *